(12) United States Patent
Punde et al.

(10) Patent No.: US 11,661,876 B2
(45) Date of Patent: May 30, 2023

(54) AFTERTREATMENT SYSTEM INCLUDING PREHEATING OXIDATION CATALYST

(71) Applicant: Cummins Emission Solutions Inc., Columbus, IN (US)

(72) Inventors: Shirish S. Punde, Columbus, IN (US); Rayomand Dabhoiwala, Columbus, IN (US); James Nicholas Reynolds, Indianapolis, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 0 days.

(21) Appl. No.: 17/642,173

(22) PCT Filed: Sep. 3, 2020

(86) PCT No.: PCT/US2020/049231
§ 371 (c)(1),
(2) Date: Mar. 10, 2022

(87) PCT Pub. No.: WO2021/050356
PCT Pub. Date: Mar. 18, 2021

(65) Prior Publication Data
US 2022/0268193 A1   Aug. 25, 2022

Related U.S. Application Data

(60) Provisional application No. 62/900,220, filed on Sep. 13, 2019.

(51) Int. Cl.
*F01N 3/20* (2006.01)
*F01N 3/10* (2006.01)
(Continued)

(52) U.S. Cl.
CPC ........... *F01N 3/2033* (2013.01); *F01N 3/106* (2013.01); *F01N 3/2013* (2013.01);
(Continued)

(58) Field of Classification Search
CPC combination set(s) only.
See application file for complete search history.

(56) References Cited

U.S. PATENT DOCUMENTS 7,818,960 B2   10/2010  Gonze et al.
8,627,651 B2    1/2014  Ponnathpur
(Continued)

FOREIGN PATENT DOCUMENTS

DE   10 2012 209 197 A1   6/2012
JP       2009-013930 A    1/2009

OTHER PUBLICATIONS

California Air Resources Board Staff Current Assessment of the Technical "Feasibility of Lower NOx Standards and Associated Test Procedures for 2022 and Subsequent Model Year Medium-Duty and Heavy-Duty Diesel Engines," Staff White Paper, California Air Resources Board, Apr. 18, 2019, 73 pages.
(Continued)

*Primary Examiner* — Binh Q Tran
(74) *Attorney, Agent, or Firm* — Foley & Lardner LLP (57) ABSTRACT

An aftertreatment system for treating an exhaust gas comprises an exhaust conduit, a preheating oxidation catalyst, a primary oxidation catalyst disposed downstream of the preheating oxidation catalyst, and a selective catalytic reduction system disposed in the exhaust conduit downstream of the primary oxidation catalyst. A controller is configured to determine a temperature of an exhaust gas at an inlet of the selective catalytic reduction system. In response to the temperature being below a threshold temperature, the controller generates a hydrocarbon insertion signal configured to cause hydrocarbons to be inserted into or upstream of the preheating oxidation catalyst so as to increase a temperature of the exhaust gas to above the threshold temperature.

19 Claims, 7 Drawing Sheets

(51) Int. Cl.
*F01N 3/36* (2006.01)
*F01N 3/08* (2006.01)

(52) U.S. Cl.
CPC .......... *F01N 3/2066* (2013.01); *F01N 3/0814* (2013.01); *F01N 3/103* (2013.01); *F01N 3/208* (2013.01); *F01N 3/36* (2013.01); *F01N 2240/16* (2013.01); *F01N 2370/04* (2013.01); *F01N 2570/14* (2013.01); *F01N 2610/03* (2013.01); *F01N 2900/1404* (2013.01); *F01N 2900/1811* (2013.01)

(56) References Cited

U.S. PATENT DOCUMENTS

| | | | |
|---|---|---|---|
| 8,904,764 B2 | 12/2014 | Baier et al. | |
| 10,145,343 B2 | 12/2018 | Liu et al. | |
| 10,480,369 B1* | 11/2019 | Dahodwala | F01N 3/106 |
| 2003/0167756 A1* | 9/2003 | Szymkowicz | F01N 13/0093 |
| | | | 60/289 |
| 2010/0290957 A1* | 11/2010 | Yoshida | F01N 3/208 |
| | | | 422/171 |
| 2013/0111886 A1* | 5/2013 | Gonze | F01N 3/2066 |
| | | | 60/286 |
| 2014/0311123 A1* | 10/2014 | Gonze | F01N 11/002 |
| | | | 60/299 |
| 2015/0113963 A1 | 4/2015 | Anilovich et al. | |
| 2015/0275801 A1* | 10/2015 | Nagaoka | F01N 9/00 |
| | | | 60/285 |
| 2016/0281619 A1* | 9/2016 | Kale | F02D 19/06 |
| 2017/0037801 A1* | 2/2017 | Ota | F01N 3/0885 |

OTHER PUBLICATIONS

Culbertson et al. "Exhaust Heating System Performance for Boosting SCR Low Temperature Efficiency," SAE International, SAE 2018-01-1428, 26 pages.

Dahodwala et al., "1489Strategies for Meeting Phase 2 GHG and Ultra-Low NOx Emission Standards for Heavy-Duty Diesel Engines," SAE 2018-01-1489, WCX, World Congress Experience Apr. 10-12, 2018 Cobo Center, Detroit, Michigan, 20 pages.

International Search Report and Written Opinion issued for PCT Application No. PCT/US2020/049231 dated Dec. 4, 2020, 9 pages.

Sharp et al. "California Air Resources Board Staff Current Assessment of the Technical Feasibility of Lower NOx Standards and Associated Test Procedures for 2022 and Subsequent Model Year Medium-Duty and Heavy-Duty Diesel Engines," Final Report SwRI Project 19503, Prepared for: California Air Resources Board, Southwest Research Institute, Apr. 2017, 403 pages.

Examination Report issued in United Kingdom Patent Application No. GB2203309.6, dated May 9, 2022, 4 pages.

Office Action issued in German Patent Application No. DE 112020005323.1 dated Dec. 20, 2022.

\* cited by examiner

ABSTRACT

AFTERTREATMENT SYSTEM INCLUDING PREHEATING OXIDATION CATALYST

CROSS-REFERENCE TO RELATED APPLICATIONS

The present application is a National Phase Application of PCT Application No. PCT/US2020/049231, filed Sep. 3, 2020, which claims the benefit of U.S. Provisional Application No. 62/900,220, filed Sep. 13, 2019, the entire disclosure of which is hereby incorporated by reference herein.

TECHNICAL FIELD

The present disclosure relates generally to the field of aftertreatment systems, and in particular to systems and methods for managing temperature in an aftertreatment system.

BACKGROUND

Exhaust aftertreatment systems are used to receive and treat exhaust gas generated by internal combustion engines. Generally, exhaust gas aftertreatment systems include any of several different components to reduce the levels of harmful exhaust emissions present in the exhaust gas. For example, certain exhaust gas aftertreatment systems for diesel-powered internal combustion engines include a selective catalytic reduction (SCR) system including a catalyst formulated to convert $NO_x$ (NO and $NO_2$ in some fraction) into harmless nitrogen gas ($N_2$) and water vapor ($H_2O$) in the presence of ammonia ($NH_3$). Generally, in such aftertreatment systems, an exhaust reductant, (e.g., a diesel exhaust fluid such as urea) is injected into the SCR system to provide a source of ammonia, and mixed with the exhaust gas to partially reduce the $NO_x$ gases. The reduction byproducts of the exhaust gas are then fluidly communicated to the catalyst included in the SCR system to decompose substantially all of the $NO_x$ gases into relatively harmless byproducts, which are expelled out of the aftertreatment system.

In certain situations, for example, when an engine is cold started, a temperature of the exhaust gas may be too low to effectively decompose reductant and generate ammonia. Moreover, a SCR temperature of the SCR system may be below an optimum operational temperature of the SCR system. This can cause a catalytic conversion efficiency of the SCR system to be lower than a desired catalytic conversion efficiency, which leads to a higher amount of $NO_x$ gases in the exhaust gas that is expelled into the environment after passing through the aftertreatment system, which is undesirable.

SUMMARY

Embodiments described herein relate generally to systems and methods for heating an exhaust gas flowing into an aftertreatment system, and in particular, to aftertreatment systems that include a preheating oxidation catalyst that combusts hydrocarbons inserted therein when the temperature of the exhaust gas entering the aftertreatment system is below a threshold temperature, so as to increase a temperature of the exhaust gas.

In some embodiments, an aftertreatment system for treating exhaust gas produced by an engine comprises: an exhaust conduit configured to receive the exhaust gas; a preheating oxidation catalyst; a primary oxidation catalyst disposed downstream of the preheating oxidation catalyst; a SCR system disposed in the exhaust conduit downstream of the primary oxidation catalyst; and a controller. The controller is configured to: determine a temperature of the exhaust gas at an inlet of the SCR system, and in response to the temperature of the exhaust gas at the inlet of the SCR system being below a threshold temperature, generate a hydrocarbon insertion command configured to cause hydrocarbons to be inserted into the preheating oxidation catalyst or into the exhaust gas upstream of the preheating oxidation catalyst. The preheating oxidation catalyst is configured to catalyze combustion of the inserted hydrocarbons so as to increase the temperature of the exhaust gas to be above the threshold temperature.

In some embodiments, the controller is configured to cause the hydrocarbons to be inserted in response to a temperature of the exhaust gas being greater than a light off temperature of the preheating oxidation catalyst.

In some embodiments, the aftertreatment system further comprises a heater operatively coupled to the preheating oxidation catalyst, wherein the controller configured to selectively activate the heater in response to the temperature of the exhaust gas being less than the light off temperature of the preheating oxidation catalyst.

In some embodiments, the controller is further configured to: in response to the temperature of the exhaust gas reaching a light off temperature of the primary oxidation catalyst but still being below the threshold temperature, insert hydrocarbons into the primary oxidation catalyst or into the exhaust gas between the preheating oxidation catalyst and the primary oxidation catalyst.

In some embodiments, the controller is further configured to: in response to the temperature of the SCR system increasing to be equal to or greater than an upper threshold temperature that is greater than the threshold temperature, stop insertion of the hydrocarbons.

In some embodiments, the SCR system comprises an upstream catalyst and a downstream catalyst disposed downstream of the upstream catalyst. In some embodiments, the upstream catalyst comprises a FeZ catalyst. In some embodiments, the downstream catalyst comprises a CuZ catalyst.

In some embodiments, the hydrocarbons are inserted via a hydrocarbon insertion assembly included in the aftertreatment system and/or via the engine. In some embodiments, the preheating oxidation catalyst has a light off temperature that is lower than a light off temperature of the primary oxidation catalyst.

In some embodiments, the aftertreatment system further comprises: a first hydrocarbon injector disposed upstream of the preheating oxidation catalyst; and a second hydrocarbon injector disposed between the preheating oxidation catalyst and the primary oxidation catalyst.

In some embodiments, a method for controlling operations of an aftertreatment system comprising a preheating oxidation catalyst, a primary oxidation catalyst disposed downstream of the preheating oxidation catalyst, and a SCR system disposed downstream of the primary oxidation catalyst, the method comprising: determining, by a controller, a temperature of the exhaust gas at an inlet of the SCR system; and in response to the temperature of the exhaust gas at the inlet of the SCR system being below a threshold temperature, generating, by the controller, a hydrocarbon insertion command configured to cause hydrocarbons to be inserted into the preheating oxidation catalyst or into the exhaust gas upstream of the preheating oxidation catalyst, the preheating oxidation catalyst being configured to catalyze combustion of the inserted hydrocarbons so as to increase a temperature of the exhaust gas to be above the threshold temperature.

In some embodiments, the hydrocarbons are caused to be inserted, by the controller, in response to a temperature of the exhaust gas being greater than a light off temperature of the preheating oxidation catalyst.

In some embodiments, the aftertreatment system further comprises a heater operatively coupled to the preheating oxidation catalyst, and wherein the method further comprises: causing activation of the heater, by the controller, in response to the temperature of the exhaust gas being less than the light off temperature of the preheating oxidation catalyst.

In some embodiments, the method further comprising: in response to the temperature of the exhaust gas reaching a light off temperature of the primary oxidation catalyst but still being below the threshold temperature, causing insertion of the hydrocarbons, by the controller, into the primary oxidation catalyst or into the exhaust gas between the preheating oxidation catalyst and the primary oxidation catalyst.

In some embodiments, the method further comprises: in response to the temperature of the selective catalytic reduction system increasing to be equal to or greater than an upper threshold temperature that is greater than the threshold temperature, stopping, by the controller, the insertion of the hydrocarbons.

In some embodiments, a controller for controlling operations of an aftertreatment system comprising a preheating oxidation catalyst, a primary oxidation catalyst disposed downstream of the preheating oxidation catalyst, and a SCR system disposed downstream of the primary oxidation catalyst, is configured to: determine a temperature of the exhaust gas at an inlet of the SCR system; and in response to the temperature of the exhaust gas at the inlet of the SCR system being below a threshold temperature, generate a hydrocarbon insertion command configured to cause hydrocarbons to be inserted into the preheating oxidation catalyst or into the exhaust gas upstream of the preheating oxidation catalyst, the preheating oxidation catalyst being configured to catalyze combustion of the inserted hydrocarbons so as to increase a temperature of the exhaust gas to above the threshold temperature.

In some embodiments, the controller generates the hydrocarbons insertion command in response to a temperature of the exhaust gas being greater than a light off temperature of the preheating oxidation catalyst.

In some embodiments, the aftertreatment system further comprises a heater operatively coupled to the preheating oxidation catalyst, and wherein the controller is further configured to: selectively activate the heater in response to the temperature of the exhaust gas being less than the light off temperature of the preheating oxidation catalyst.

In some embodiments, the controller is further configured to: in response to the temperature of the exhaust gas reaching a light off temperature of the primary oxidation catalyst but still being below the threshold temperature, cause insertion of the hydrocarbons into the primary oxidation catalyst or into the exhaust gas between the preheating oxidation catalyst and the primary oxidation catalyst.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for heating an exhaust gas flowing into an aftertreatment system, and in particular, to aftertreatment systems that include a preheating oxidation catalyst that combusts hydrocarbons inserted therein when the temperature of the exhaust gas entering the aftertreatment system is below a threshold temperature so as to increase a temperature of the exhaust gas.

Aftertreatment systems that can achieve ultra-low $NO_x$ at a tail pipe of the aftertreatment system (e.g., reduction of $NO_x$ gases of greater than 50-75%) are desirable for meeting the future emission regulations for diesel engines. One of the key bottlenecks in meeting ultra-low $NO_x$ regulations is the inability of conventional SCR systems to convert $NO_x$ at low temperatures, for example, at temperatures of less than about 175 degrees Celsius. Due to the low activity of conventional SCR systems at low temperatures, significant $NO_x$ is emitted at tail pipe during cold start, i.e., when an exhaust gas emitted by an engine that is started after being cold for some time. To meet the ultra-low $NO_x$ regulations, more than 50-75% tail pipe $NO_x$ reduction is required compared to the current tail pipe $NO_x$ regulations. However, the future regulations also demand lower greenhouse gas (e.g., $CO_2$) emissions.

Various solutions have been proposed to meet ultra-low $NO_x$ requirements as well as regeneration of filter (e.g., diesel particulate filters) included in aftertreatment systems. These include, for example, increasing the engine out temperatures by increasing the amount of fuel being burned in the engine (e.g., by running then engine under rich conditions) to heat the SCR system faster and increase $NO_x$ conversion efficiency. This approach, however, decreases fuel efficiency as a larger amount of fuel has to be burned in the engine to increase engine out exhaust gas temperature, and also increases $CO_2$ emissions.

Another approach includes decreasing the thermal mass upstream of the SCR system, which may require different architectures compared to conventional aftertreatment architectures. For example, one approach includes removing the upstream filter and positioning the filter after the SCR system. However, this type of architecture has significant trade-offs with filter regeneration interval, because the placement of the SCR system upstream of the filter consumes all of the $NO_x$, resulting in minimal to no passive soot oxidation. This results in frequent soot based regeneration events. Similarly, for other architectures that involve decreasing thermal mass upstream of the SCR system, significant trade-offs typically exist, making their implementation difficult. An external heater can be operatively coupled to the SCR system to increase its temperature at engine startup, but this increases power consumption and complexity of the aftertreatment system.

The principle objective of these approaches is to obtain ultra-low $NO_x$ at tail pipe (e.g., $NO_x$ reduction of greater than 75%) during a transient cycle, i.e., when the exhaust gas is at a temperature lower than an optimal operational temperature of the SCR system (e.g., less than about 175 degrees Celsius). This low temperature exhaust gas is generally emitted by the engine during the first 400-500 seconds of the cold and warm federal test procedure (FTP) cycles, and results in about 90-95% of an initial amount of $NO_x$ included in the exhaust gas that enters the aftertreatment system, to be expelled into the environment. This is because the SCR system is not active at these temperatures, and the reductant cannot be dosed during the first few seconds of cold and warm cycle due to low temperature. However, as previously described herein, conventional approaches have several drawbacks which limit their feasibility.

Various embodiments of the systems and methods described herein may provide one or more benefits including, for example: (1) increasing temperature of an exhaust gas entering an SCR system to an optimum temperature for operation of the SCR system during transient phase via a preheating oxidation catalyst disposed upstream of the SCR system; (2) providing lower thermal mass upstream of the SCR system; (3) allowing easy integration with existing aftertreatment systems; and (4) providing ultra-low $NO_x$ emissions at a tail pipe of the aftertreatment system during transient phase.

Figure 1:
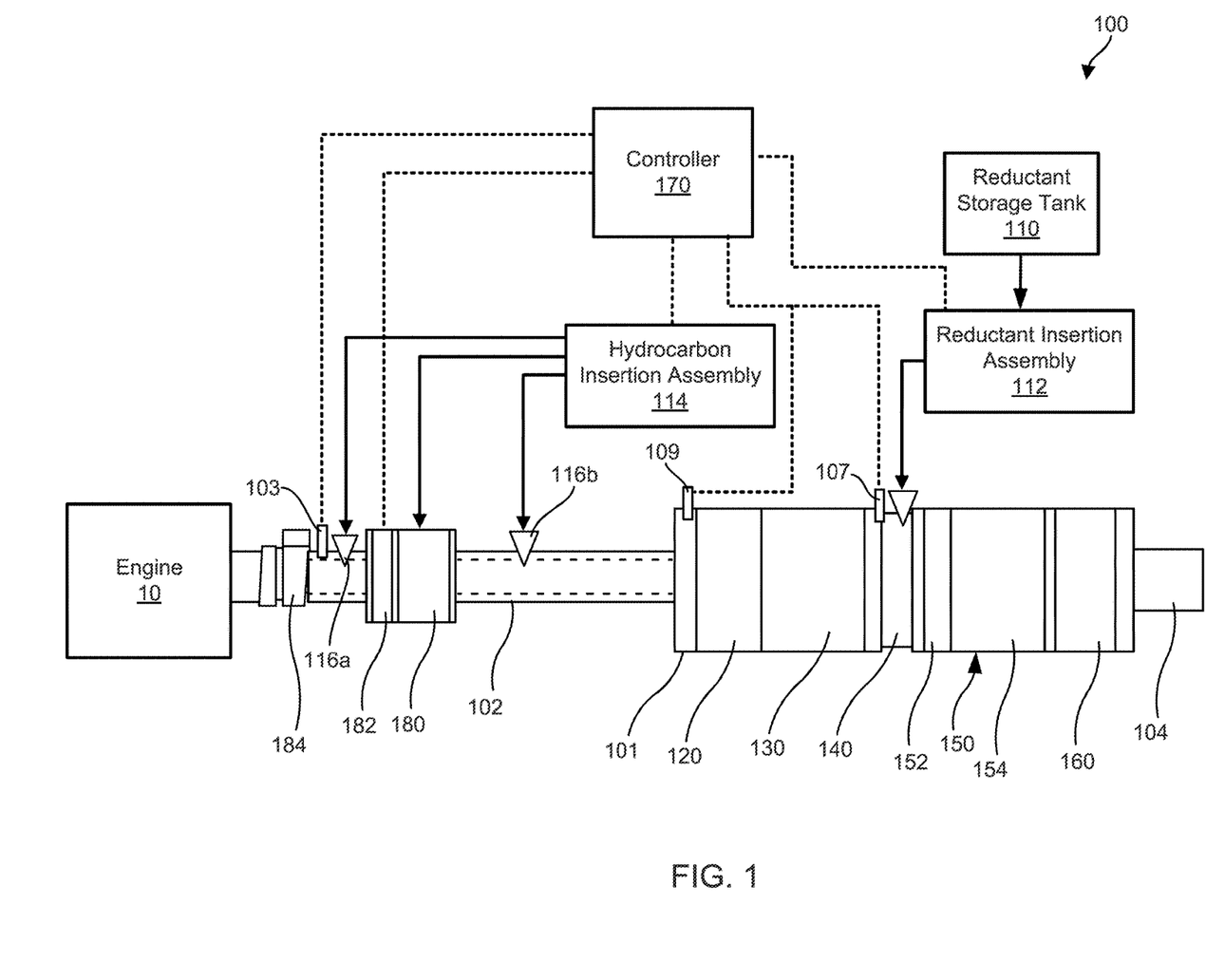
FIG. 1 is a schematic illustration of an aftertreatment system including a preheating oxidation catalyst, according to an embodiment.

FIG. 1 is a schematic illustration of an aftertreatment system 100, according to an embodiment. The aftertreatment system 100 is configured to receive an exhaust gas (e.g., a diesel exhaust gas) from an engine 10 and decompose constituents of the exhaust gas such as, for example, $NO_x$ gases, CO, etc. The aftertreatment system 100 includes a reductant storage tank 110, a reductant insertion assembly 112, a SCR system 150, a primary oxidation catalyst 120, a preheating oxidation catalyst 180, and a controller 170, and may optionally also include a hydrocarbon insertion assembly 114, a filter 130, a mixer 140, and an ammonia oxidation catalyst 160.

The engine 10 may be an internal combustion engine, for example a diesel engine, a gasoline engine, a natural gas engine, a biodiesel engine, a dual fuel engine, an alcohol engine, an E85 or any other suitable internal combustion engine.

The reductant storage tank 110 contains a reductant formulated to facilitate reduction of the constituents of the exhaust gas (e.g., $NO_x$ gases) by a catalyst included in the SCR system 150. In embodiments in which the exhaust gas is a diesel exhaust gas, the reductant may include a diesel exhaust fluid (DEF) that provides a source of ammonia. Suitable DEFs can include urea, aqueous solution of urea or any other DEF (e.g., the DEF available under the tradename ADBLUE®). In particular embodiments, the reductant includes an aqueous urea solution containing 32.5% urea and 67.5% de-ionized water. In other embodiments, the reductant includes aqueous urea solution containing 40% urea and 60% de-ionized water.

The reductant insertion assembly 112 is fluidly coupled to the reductant storage tank 110, and is configured to receive the reductant from the reductant storage tank 110 and insert the reductant into the exhaust gas flowing through the aftertreatment system 100, for example, upstream of the SCR system 150.

The SCR system 150 is configured to receive and treat the exhaust gas (e.g., a diesel exhaust gas) flowing through the SCR system 150 in the presence of ammonia. The aftertreatment system 100 includes an exhaust conduit 101 defining an exhaust flow path for communicating the exhaust gas. The SCR system 150 is positioned within the exhaust conduit 101. In some embodiments, the exhaust conduit 101 includes an inlet tube 102 positioned upstream of the SCR system 150 and configured to receive exhaust gas from the engine 10 and communicate the exhaust gas to the SCR system 150. The exhaust conduit 101 may also include an outlet tube 104 for expelling treated exhaust gas into the environment. The outlet tube 104 may be coupled to a tail pipe. In some embodiments, the SCR system 150 may include an upstream catalyst 152 (e.g., a FeZ catalyst) and a downstream catalyst 154 (e.g., a CuZ catalyst).

A primary oxidation catalyst 120 (e.g., a diesel oxidation catalyst) may be disposed upstream of the SCR system 150 and configured to oxidize unburnt hydrocarbons that may be present in the exhaust gas. A filter 130 (e.g., a diesel particulate filter) may be disposed downstream of the primary oxidation catalyst 120 and upstream of the SCR system 150, and is configured to filter particulate matter (e.g., soot, ash, etc.) included in the exhaust gas. In some embodiments, the hydrocarbon insertion assembly 114 is configured to insert hydrocarbons into the exhaust gas upstream of the primary oxidation catalyst 120. The primary oxidation catalyst 120 is configured to catalyze combustion of the hydrocarbons so as to increase a temperature of the exhaust gas to a temperature sufficient to regenerate the filter 130 and/or the SCR system 150.

In some embodiments, a mixer 140 may be disposed upstream of the SCR system 150 and configured to facilitate mixing of the reductant with the exhaust gas before the reductant flows into the SCR system 150. In some embodiments, the ammonia oxidation catalyst 160 may be disposed downstream of the SCR system 150 and configured to treat any ammonia that may have remain unconsumed by the SCR system 150, i.e., prevent ammonia slip.

As previously described herein, during transient phases, e.g., during cold or warm engine cycles, a temperature of the exhaust gas may be less than a threshold temperature, for example, less than about 175 degrees Celsius. At such low temperatures, the reductant may not completely decompose, and the SCR system 150 may be operating at a temperature at which a catalytic conversion efficiency of the SCR system 150 is significantly lower than an optimal catalytic conversion efficiency thereof. This can lead to higher $NO_x$ emissions in the exhaust gas expelled out of the aftertreatment system 100.

To increase a temperature of the exhaust gas during such transient phases, the aftertreatment system 100 also includes a preheating oxidation catalyst 180 disposed upstream of the primary oxidation catalyst 120. The preheating oxidation catalyst 180 may include a coated substrate catalyst, for example, including a metallic, cordierite, metallic foam, or any other substrate. In some embodiments, the preheating oxidation catalyst 180 may be disposed in the inlet tube 102. In some embodiments, the hydrocarbon insertion assembly 114 is configured to selectively insert hydrocarbons into the preheating oxidation catalyst 180 or into the exhaust gas upstream of the preheating oxidation catalyst 180.

In some embodiments, the aftertreatment system 100 may include a first hydrocarbon (HC) injector 116a disposed upstream of the preheating oxidation catalyst 180, and may optionally also include a second HC injector 116b disposed downstream of the preheating oxidation catalyst 180 and upstream of the primary oxidation catalyst 120. In some embodiments, the hydrocarbon insertion assembly 114 may be configured to insert hydrocarbons into the exhaust gas upstream of the preheating oxidation catalyst 180 via the first HC injector 116a. The hydrocarbon insertion assembly 114 may insert hydrocarbons into the preheating oxidation catalyst or into the exhaust gas upstream of the preheating oxidation catalyst 180 when the temperature of the exhaust gas at an inlet of the SCR system 150 (SCR inlet temperature) measured by a SCR temperature sensor 107 is less than a threshold temperature (e.g., less than about 175 degrees Celsius). In other embodiments, the hydrocarbons may be provided via the engine 10.

The preheating oxidation catalyst 180 is configured to generate heat by burning the hydrocarbons, which warms up the exhaust gas and thereby, the downstream SCR system 150. This increases the catalytic conversion efficiency of the SCR system 150 and leads to ultra-low $NO_x$ emissions even during transient phases of the engine 10 (e.g., at cold start or warm start). The preheating oxidation catalyst 180 is specifically designed to burn hydrocarbons at lower temperature and generate heat. When hydrocarbons (e.g., diesel fuel) are injected over the preheating oxidation catalyst 180, the preheating oxidation catalyst 180 oxidizes those hydrocarbons and generates heat. This heat can in turn warm up the downstream aftertreatment components, for example, the SCR system 150 faster. The preheating oxidation catalyst 180 is used mainly to generate the heat for warming up the downstream SCR system 150 faster and designed to provide limited heat generation compared to the primary oxidation catalyst 120 which can generate sufficient heat to regenerate the filter 130, e.g., when the filter 130 is filled with soot.

In some embodiments, a turbocharger 184 may be installed upstream of the aftertreatment system 100 such that the exhaust gas flows through the turbocharger 184 before passing through the preheating oxidation catalyst 180 and flowing towards the SCR system 150. The preheating oxidation catalyst 180 offers the advantage of lower thermal mass compared to the primary oxidation catalyst 120, as the preheating oxidation catalyst 180 is located closer to turbocharger 184, the heat loss due to the downpipe can be avoided and can be designed specifically for heat generation by reacting hydrocarbons. The preheating oxidation catalyst 180 also has a lower light off temperature (i.e., the temperature at which the preheating oxidation catalyst 180 can ignite the hydrocarbons) than the primary oxidation catalyst 120 such that the preheating oxidation catalyst 180 can ignite the hydrocarbons at a lower temperature, for example, at temperatures less than about 175 degrees Celsius.

In some embodiments, a heater 182 (e.g., a 2 kW heater) may be operatively coupled to the preheating oxidation catalyst 180, and configured to selectively heat the preheating oxidation catalyst 180, for example, when the temperature of the exhaust gas is less than the light off temperature of the preheating oxidation catalyst 180. Using the heater 182 provides further benefit that the hydrocarbons can be dosed earlier allowing better control over $NO_x$ emissions. The use of the preheating oxidation catalyst 180 is preferably to burning the fuel in the engine 10, because burning the fuel over the preheating oxidation catalyst 180 typically has better thermal efficiency compared to burning fuel in the engine 10. In other embodiments, the preheating oxidation catalyst 180 may include an electrically heated catalyst, for example, having electrical windings configured to heat the oxidation catalyst.

A temperature sensor 103 may be disposed in the inlet tube 102 and configured to measure a temperature of the exhaust gas emitted by the engine 10, for example, after passing through the turbocharger 184. The SCR temperature sensor 107 may be disposed upstream of the SCR system 150, for example, between the SCR system 150 and the primary oxidation catalyst 120 and configured to measure the SCR inlet temperature. The controller 170 is operatively coupled to the hydrocarbon insertion assembly 114, the temperature sensor 103, and the SCR temperature sensor 107. In some embodiments, the controller 170 may also be operatively coupled to the reductant insertion assembly 112. The controller 170 may include one or more components configured to perform the operations of the controller 170 as described herein. For example, the controller 170 may include a processor (e.g., a microprocessor, programmable logic controller (PLC) chip, an ASIC chip, or any other suitable processor), that is communicable with a memory (e.g., RAM, ROM, or any other non-transitory computer readable media). The processor may be configured to execute instructions, algorithms, commands, otherwise programs stored on the memory. The controller 170 may also include one or more modules or circuitries configured to perform the various operations of the controller 170.

The controller 170 is configured to determine the SCR inlet temperature of the exhaust gas flowing into the aftertreatment system 100. For example, the controller 170 may receive a temperature signal from the SCR temperature sensor 107 and determine the SCR inlet temperature. In response to the temperature being below the threshold temperature, the controller 170 may generate a hydrocarbon insertion command configured to cause hydrocarbons to be inserted into the preheating oxidation catalyst 180 or into the exhaust gas upstream of the preheating oxidation catalyst 180. For example, the controller 170 may instruct the hydrocarbon insertion assembly 114 to insert hydrocarbons into the preheating oxidation catalyst 180 or into the exhaust gas upstream of the preheating oxidation catalyst 180, for example, via the first HC injector 116a or command the engine 10 to insert hydrocarbons into the exhaust gas entering the preheating oxidation catalyst 180. In some embodiments, the controller 170 is configured to insert the hydrocarbons into the preheating oxidation catalyst 180 or into the exhaust gas upstream of the preheating oxidation catalyst 180 in response to a temperature of the exhaust gas being higher than a light off temperature of the preheating oxidation catalyst 180.

In some embodiments in which the heater 182 is operatively coupled to the preheating oxidation catalyst 180, the controller 170 may be operatively coupled to the heater 182 and configured to selectively activate the heater 182 in response to the temperature of the exhaust gas being less than the light off temperature of the preheating oxidation catalyst 180, so as to raise the temperature of the preheating oxidation catalyst 180 to the light off temperature.

The preheating of the exhaust gas by the preheating oxidation catalyst 180 also heats the primary oxidation catalyst 120. Once a temperature of the exhaust gas reaches a light off temperature of the primary oxidation catalyst 120, the controller 170 may also instruct the hydrocarbon insertion assembly 114 to insert hydrocarbons into the primary oxidation catalyst 120 or into the exhaust gas upstream of the primary oxidation catalyst 120. The primary oxidation catalyst 120 then combusts the hydrocarbons that results in further increase in temperature of the exhaust gas and thereby, the SCR system 150.

Expanding further, in some embodiments, the aftertreatment system 100 may include each of the first HC injector 116a disposed upstream of the preheating oxidation catalyst 180 and the second HC injector 116b disposed downstream of the preheating oxidation catalyst 180. Hydrocarbons for heating the exhaust gas may be inserted by the engine 10 or via the hydrocarbon insertion assembly 114 via the first HC injector 116a and, in some embodiments, also the second HC injector 116b. Furthermore, hydrocarbons for combusting across the primary oxidation catalyst 120 may be inserted by the hydrocarbon insertion assembly 114 via the second HC injector 116b. Any suitable hydrocarbons may be inserted into the exhaust gas such as, for example, diesel, gasoline, propane, natural gas, etc. Hydrocarbon insertion via the engine 10 or through the first HC injector 116a upstream of the preheating oxidation catalyst 180, and through the second HC injector 116b may be independent of each other or interdependent on each other.

In some embodiments in which hydrocarbons can be inserted both upstream and downstream of the preheating oxidation catalyst 180, the controller 170 may be configured to initiate hydrocarbon insertion in response to the SCR inlet temperature being less than the threshold temperature. In such embodiments, the preheating oxidation catalyst 180 may be located closer to turbocharger 184 than to the primary oxidation catalyst 120. In some embodiments, hydrocarbons may be inserted both upstream and downstream of the preheating oxidation catalyst 180 (e.g., via both the first and second HC injectors 116a/b). In other embodiments, hydrocarbons may be only inserted upstream of the preheating oxidation catalyst 180 (e.g., via the first HC injector 116a), for example, when an exhaust gas temperature is greater than a light off temperature of the preheating oxidation catalyst 180. In still other embodiments, the hydrocarbons may only be inserted downstream of the preheating oxidation catalyst 180 (e.g., via the second HC injector 116b), for example, when an exhaust gas temperature is greater than a light off temperature of the primary oxidation catalyst 120. In some embodiments, the controller 170 may be configured to stop fuel insertion once the SCR inlet temperature is equal to or greater than an upper threshold temperature (e.g., greater than about 150 degrees Celsius to 500 degrees Celsius).

As previously described herein, the hydrocarbon insertion upstream of the preheating oxidation catalyst 180 (e.g., via the engine 10 or through the first HC injector 116a by the hydrocarbon insertion assembly 114) may be based on the light off temperature of the preheating oxidation catalyst 180. The light off temperature of the preheating oxidation catalyst 180 may be a temperature at which about 50% of the hydrocarbons inserted into the exhaust gas are combusted by the preheating oxidation catalyst 180. In some embodiments, the light off temperature of the preheating oxidation catalyst 180 may be in a range of about 125 degrees Celsius to about 300 degrees Celsius. In some embodiments, the controller 170 is configured to initiate hydrocarbon insertion upstream or on the preheating oxidation catalyst 180 in response to an inlet temperature of the preheating oxidation catalyst 180 (e.g., measured by the temperature sensor 103) or the bed temperature of the preheating oxidation catalyst 180 is equal to or greater than the light off temperature of the preheating oxidation catalyst 180.

In some embodiments, the controller 170 is configured to initiate hydrocarbon insertion downstream of the preheating oxidation catalyst 180, and upstream of the primary oxidation catalyst 120 (e.g., through the second HC injector 116b via the hydrocarbon insertion assembly 114) based on a light off temperature of the primary oxidation catalyst 120. For example, the controller 170 may instruct the hydrocarbon insertion assembly 114 to insert hydrocarbons into the exhaust gas in response to a primary oxidation catalyst inlet temperature (e.g., measured by a primary oxidation catalyst inlet temperature sensor 109) or bed temperature of the primary oxidation catalyst 120 being equal to or greater than the light off temperature of the primary oxidation catalyst 120. The light off temperature of the primary oxidation catalyst 120 is a temperature at which the primary oxidation catalyst 120 is capable of combusting about 50% of the hydrocarbons inserted into the exhaust gas. In some embodiments, the light off temperature of the primary oxidation catalyst 120 may be in a range of about 150 degrees Celsius to about 400 degrees Celsius.

As previously described herein, in response to a temperature of the preheating oxidation catalyst 180 being less than its light off temperature, the controller 170 may be configured to activate the heater 182 so as to heat the preheating oxidation catalyst 180. In some embodiments, the controller 170 may be configured to activate the heater 182 in response to the SCR inlet temperature being less than the threshold temperature. The controller 170 may be configured to deactivate the heater 182 in response to the SCR inlet temperature being equal to or greater than the upper threshold temperature.

In some embodiments in which the aftertreatment system 100 is configured to insert hydrocarbons upstream of the preheating oxidation catalyst 180 (e.g., via the engine 10 or the first HC injector 116a) as well as downstream of the preheating oxidation catalyst 180 (e.g., via the second HC injector 116b), and also includes the heater 182, the controller 170 may be configured to selectively and independently of each other: (a) insert hydrocarbons upstream of the preheating oxidation catalyst 180; (b) insert hydrocarbons downstream of the preheating oxidation catalyst 180; and/or (c) activate the heater 182, in response to the SCR inlet temperature being less than the temperature threshold. In other embodiments, the insertion of the hydrocarbons upstream and/or downstream of the preheating oxidation catalyst 180, and activation of the heater 182 may be performed interdependently on each other.

Activation or deactivation of each the above may be based on one or more of the SCR inlet temperature, preheating oxidation catalyst inlet or bed temperature, primary oxidation catalyst inlet or bed temperature, exhaust gas flow rate, oxygen concentration in the exhaust gas, etc. In some embodiments, the heater 182 may be activated without inserting hydrocarbons. In other embodiments, the hydrocarbons may be inserted upstream or downstream of the preheating oxidation catalyst 180 without activating the heater 182.

In some embodiments, the aftertreatment system 100 may only be configured to insert hydrocarbons upstream of the preheating oxidation catalyst 180, for example, via the engine 10 or the first HC injector 116a by the hydrocarbon insertion assembly 114, and the second HC injector 116b is excluded. In such embodiments, the preheating oxidation catalyst 180 may be located closer to primary oxidation catalyst 120 relative to the turbocharger 184. The controller 170 may be configured to insert hydrocarbons upstream of the preheating oxidation catalyst 180 and/or activate the heater 182 independently of or interdependently on each other, in response to the SCR inlet temperature being less than the threshold temperature. The controller 170 may also be configured to deactivate the heater 182 and/or hydrocarbon insertion independently of or interdependently on each other in response to the SCR inlet temperature being equal to or greater than the upper threshold temperature. Activation or deactivation of each the above may be based on one or more of the SCR inlet temperature, preheating oxidation catalyst inlet or bed temperature, primary oxidation catalyst inlet or bed temperature, exhaust gas flow rate, oxygen concentration in the exhaust gas, etc.

Insertion of the hydrocarbons upstream of the preheating oxidation catalyst 180 may be based on the light off temperature of the preheating oxidation catalyst 180 as previously described herein. In some embodiments, the heater 182 may be activated without inserting hydrocarbons. In other embodiments, the hydrocarbons may be inserted upstream or downstream of the preheating oxidation catalyst 180 without activating the heater 182.

In some embodiments, the controller 170 may be configured to receive a SCR inlet temperature signal from the SCR temperature sensor 107 and determine the SCR inlet temperature therefrom. The controller 170 may be configured to stop inserting hydrocarbons into the preheating oxidation catalyst 180 or into the exhaust gas upstream of the preheating oxidation catalyst 180 once the SCR system temperature is equal to or greater than the upper threshold temperature, for example, about 250 degrees Celsius. The controller 170 may start the hydrocarbon insertion again in response to the SCR system temperature falling below the upper threshold temperature. Once the temperature of the exhaust gas and/or the SCR system 150 is equal to or greater than the threshold temperature, the controller 170 may instruct the reductant insertion assembly 112 to insert the reductant into the exhaust gas.

In some embodiments in which hydrocarbons are inserted by the engine 10 or the hydrocarbon insertion assembly 114 upstream of the heater 182, the preheating oxidation catalyst 180 may be excluded and preheating of the exhaust gas may be performed solely by the heater 182. In such embodiments, the controller 170 may be configured to activate the heater 182 and/or cause insertion of hydrocarbons into the exhaust gas upstream of the heater 182 independently or interdependently of each other, in response to the SCR inlet temperature being less than the temperature threshold. Activation or deactivation of each the above may be based on one or more of the SCR inlet temperature, preheating oxidation catalyst inlet or bed temperature, primary oxidation catalyst inlet or bed temperature, exhaust gas flow rate, oxygen concentration in the exhaust gas, etc. In some embodiments, the heater 182 may be activated without inserting hydrocarbons. In other embodiments, the hydrocarbons may be inserted upstream or downstream of the preheating oxidation catalyst 180 without activating the heater 182. Hydrocarbon insertion may be based on the light off temperature of the primary oxidation catalyst 120, as previously described herein. The heater 182 may enable faster hydrocarbon insertion.

Figure 2:
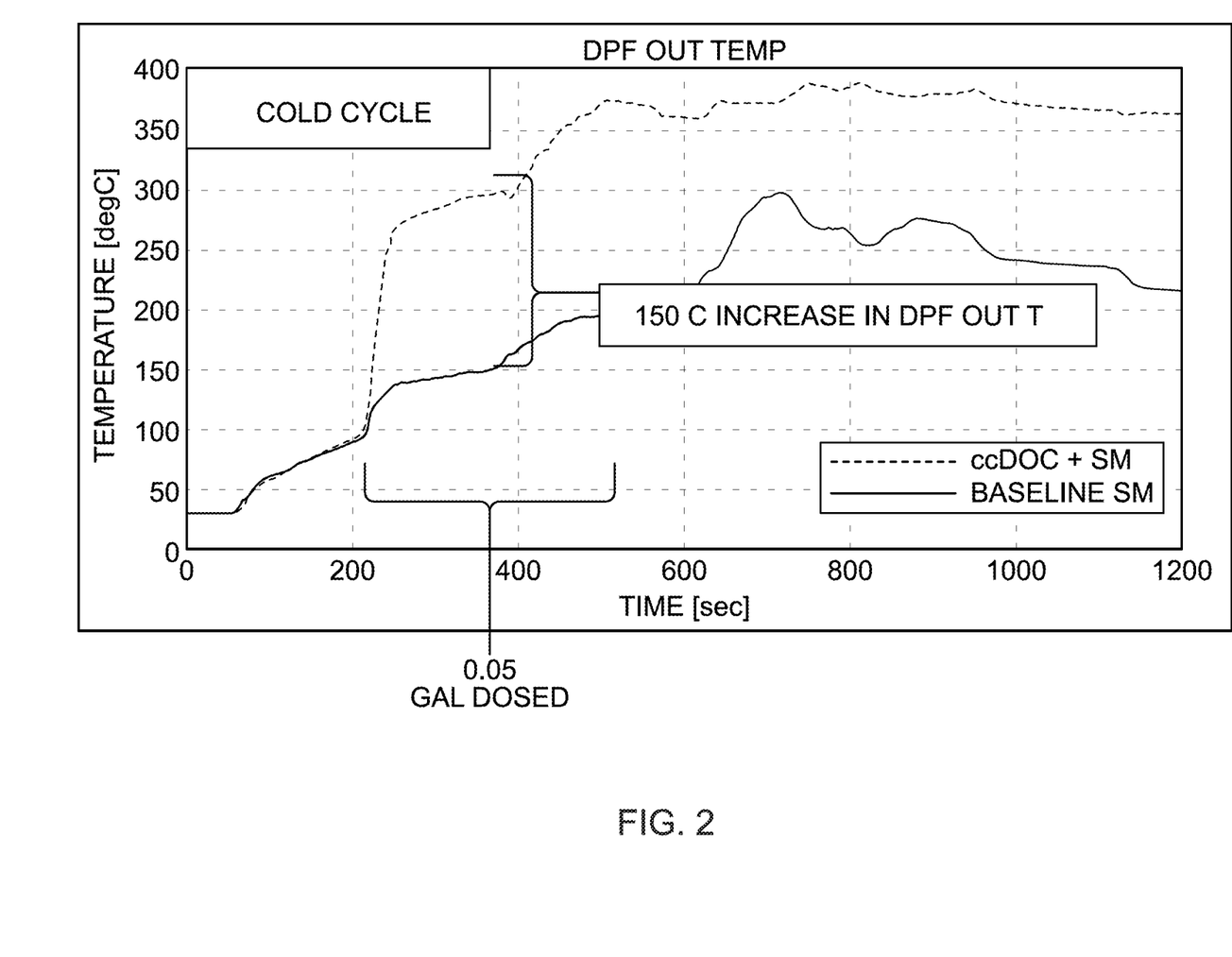
FIG. 2 are plots showing temperatures of an exhaust gas that has been emitted by an engine at cold start, flowing towards a downstream SCR system without preheating the exhaust (Baseline SM), and with the exhaust being preheated by a preheating oxidation catalyst (ccDOC+SM).

FIGS. 2-6 are plots obtained via various simulations of increase in exhaust gas temperature of exhaust gas flowing through an aftertreatment system by preheating the exhaust gas with a preheating oxidation catalyst. For example, FIG. 2 are plots showing temperatures of an exhaust gas, that has been emitted by an engine at cold start, flowing towards a downstream SCR system without preheating the exhaust (Baseline SM) and with the exhaust being preheated by a preheating oxidation catalyst (ccDOC+SM). The temperatures are measured at an outlet of a filter included in the aftertreatment system. The temperature of the SCR system can be increased significantly during a cold FTP cycle as observed from FIG. 2.

Figure 3:
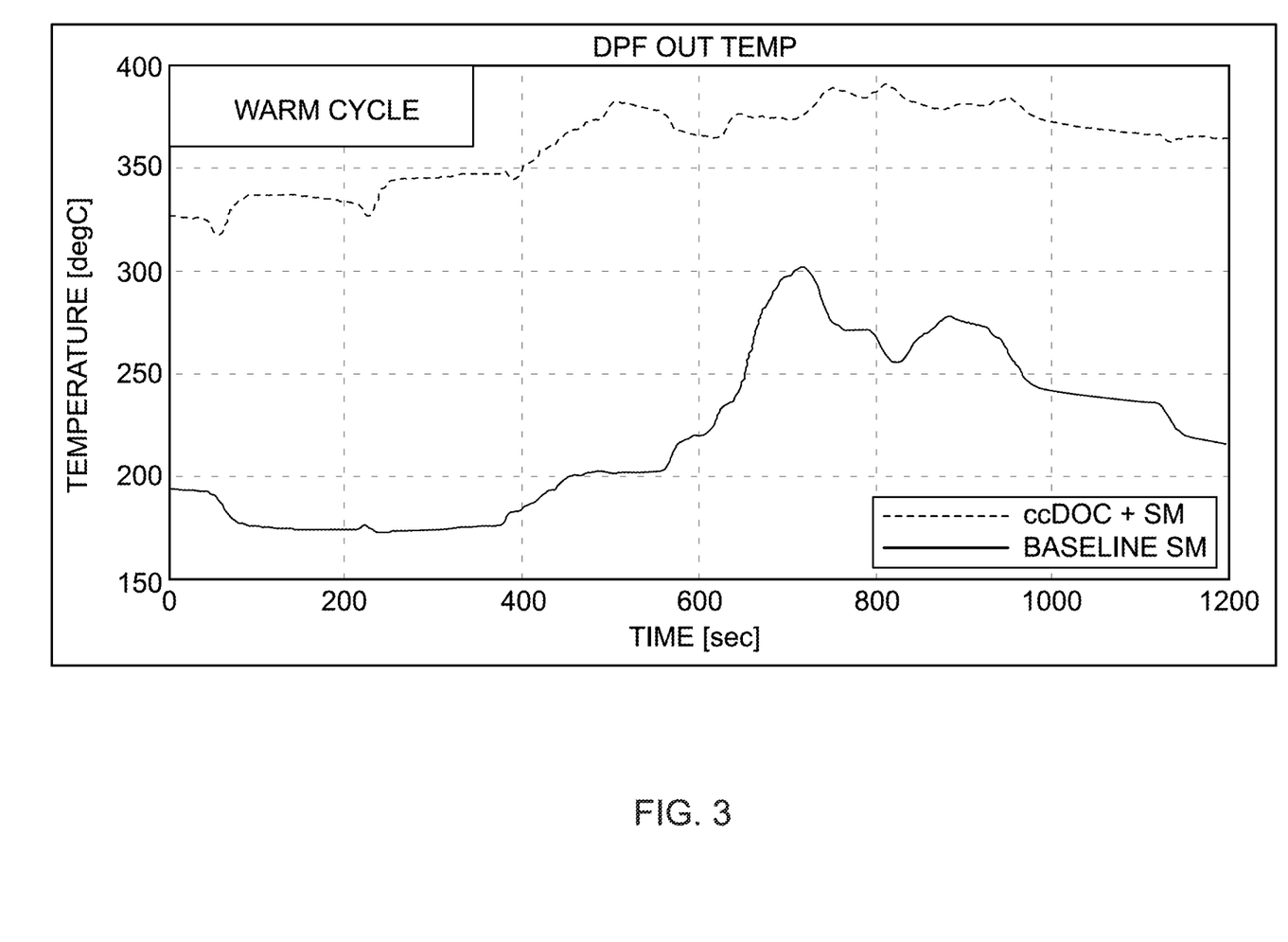
FIG. 3 are plots showing temperatures of an exhaust gas, that has been emitted by an engine at warm start, flowing towards a downstream SCR system without preheating the exhaust gas (Baseline SM), and with the exhaust being preheated by the preheating oxidation catalyst (ccDOC+SM).

FIG. 3 are plots showing temperatures of an exhaust gas, that has been emitted by an engine at warm start, flowing towards a downstream SCR system without preheating the exhaust gas (Baseline SM) and with the exhaust being preheated by the preheating oxidation catalyst (ccDOC+SM). The temperatures are measured at an outlet of a filter (e.g., measured by the SCR temperature sensor 107) included in the aftertreatment system. The temperature of the SCR system can be increased significantly during a warm FTP cycle as observed from FIG. 3.

The selected hydrocarbon dosing criteria can have a significant impact on the temperature profile of the downstream aftertreatment components. The preheating oxidation catalyst allows optimal hydrocarbon dosing that enables faster SCR system warm-up at lower $CO_2$ emissions. One example of a slightly better optimized hydrocarbon dosing strategy and how it improves a SCR inlet temperature of a SCR system, as well as SCR system performance is shown in FIGS. 4 and 5.

Figure 4:
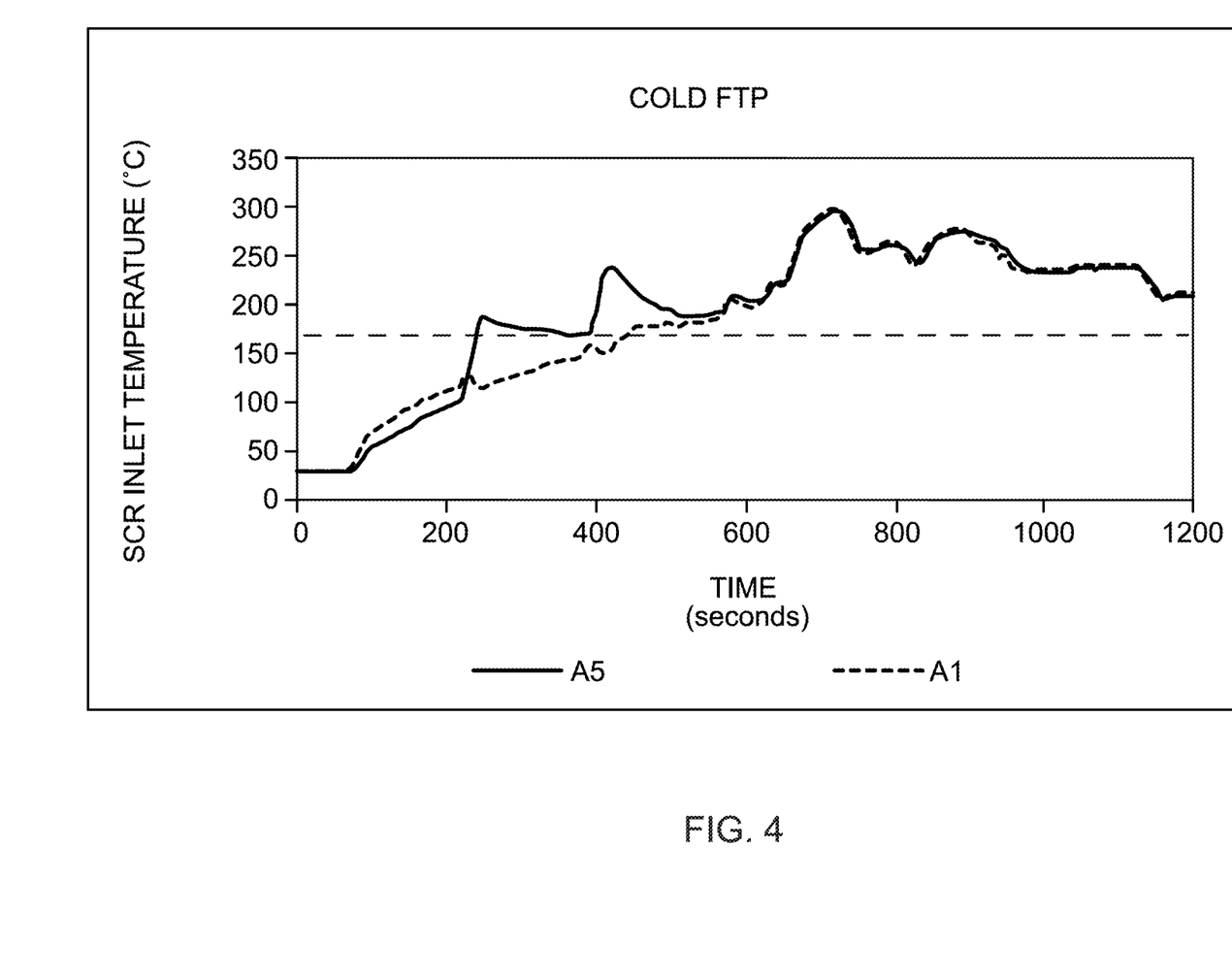
FIG. 4 are plots showing increase in SCR inlet temperature over time due to an exhaust gas, that has been emitted by an engine at cold start, without the exhaust gas being preheated (A1), and with the exhaust gas being preheated by the preheating oxidation catalyst (A5).
Figure 5:
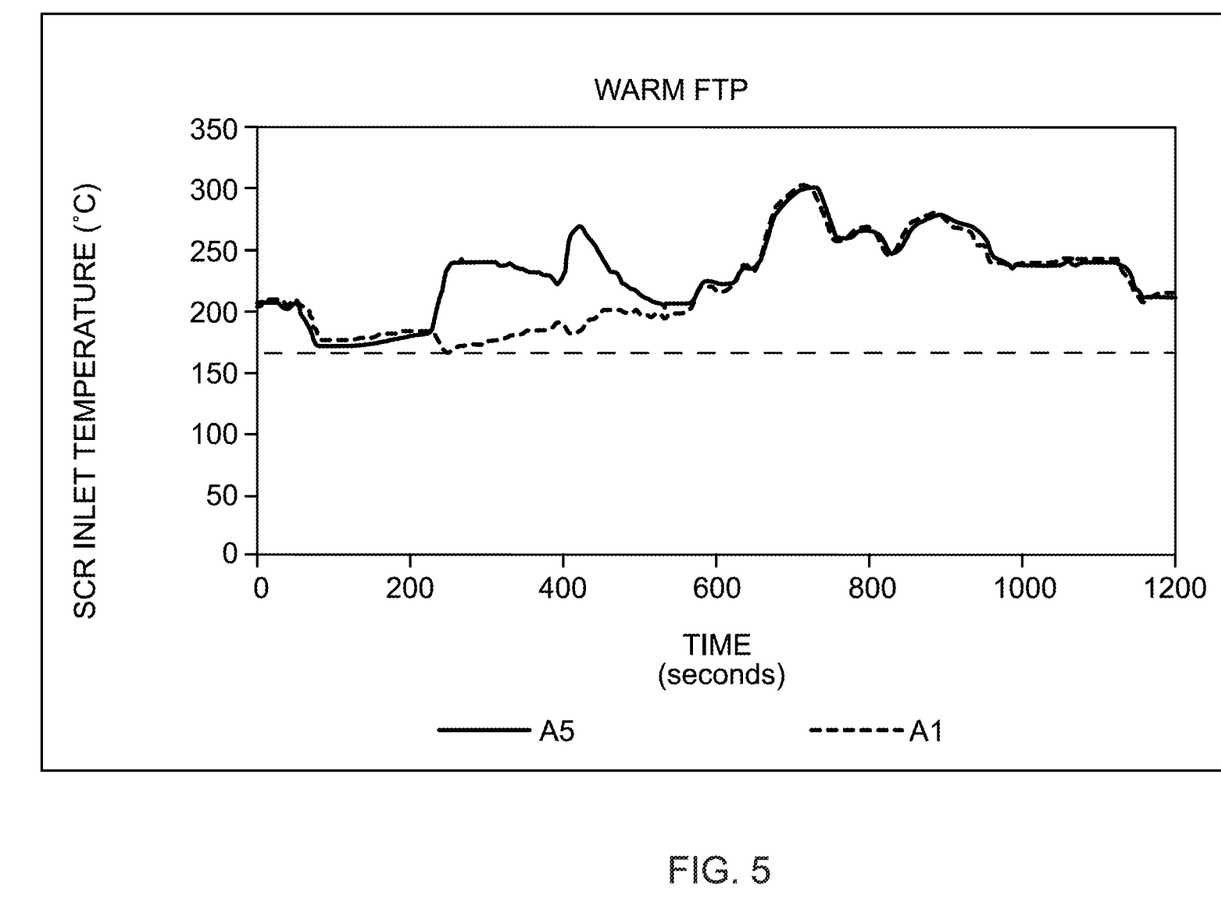
FIG. 5 are plots showing increase in SCR inlet temperature over time due to an exhaust gas, that has been emitted by an engine at warm start, without the exhaust gas being preheated (A1), and with the exhaust gas being preheated by the preheating oxidation catalyst (A5).

FIG. 4 are plots showing increase in SCR inlet temperature over time due to an exhaust gas that has been emitted by an engine at cold start, without the exhaust gas being preheated (A1) and with the exhaust gas being preheated by the preheating oxidation catalyst (A5). FIG. 5 are plots showing increase in SCR inlet temperature over time due to an exhaust gas, that has been emitted by an engine at warm start, without the exhaust gas being preheated (A1) and with the exhaust gas being preheated by the preheating oxidation catalyst (A5). As can be seen from FIG. 4 and FIG. 5, the optimized hydrocarbon dosing strategy used for the aftertreatment architecture A5 (architecture with preheating oxidation catalyst) is specifically targeting the low temperature region and it helps in warming up the SCR system faster. Further, when the SCR inlet temperature is equal to or greater than about 250 degrees Celsius, the hydrocarbon dosing is stopped, hence minimizing the amount of $CO_2$ being expelled into the environment.

Hydrocarbon burning over the preheating oxidation catalyst in aftertreatment system with preheating oxidation catalyst (A5) enables faster warm up and better temperatures for downstream SCR system. The % time spent above the DEF dosing threshold temperature is greater for A5 compared to baseline architecture A1 that does not include the preheating oxidation catalyst. Moreover, better SCR bed temperatures lead to improved SCR $NO_x$ conversion efficiency for A5 compared to A1.

Figure 6:
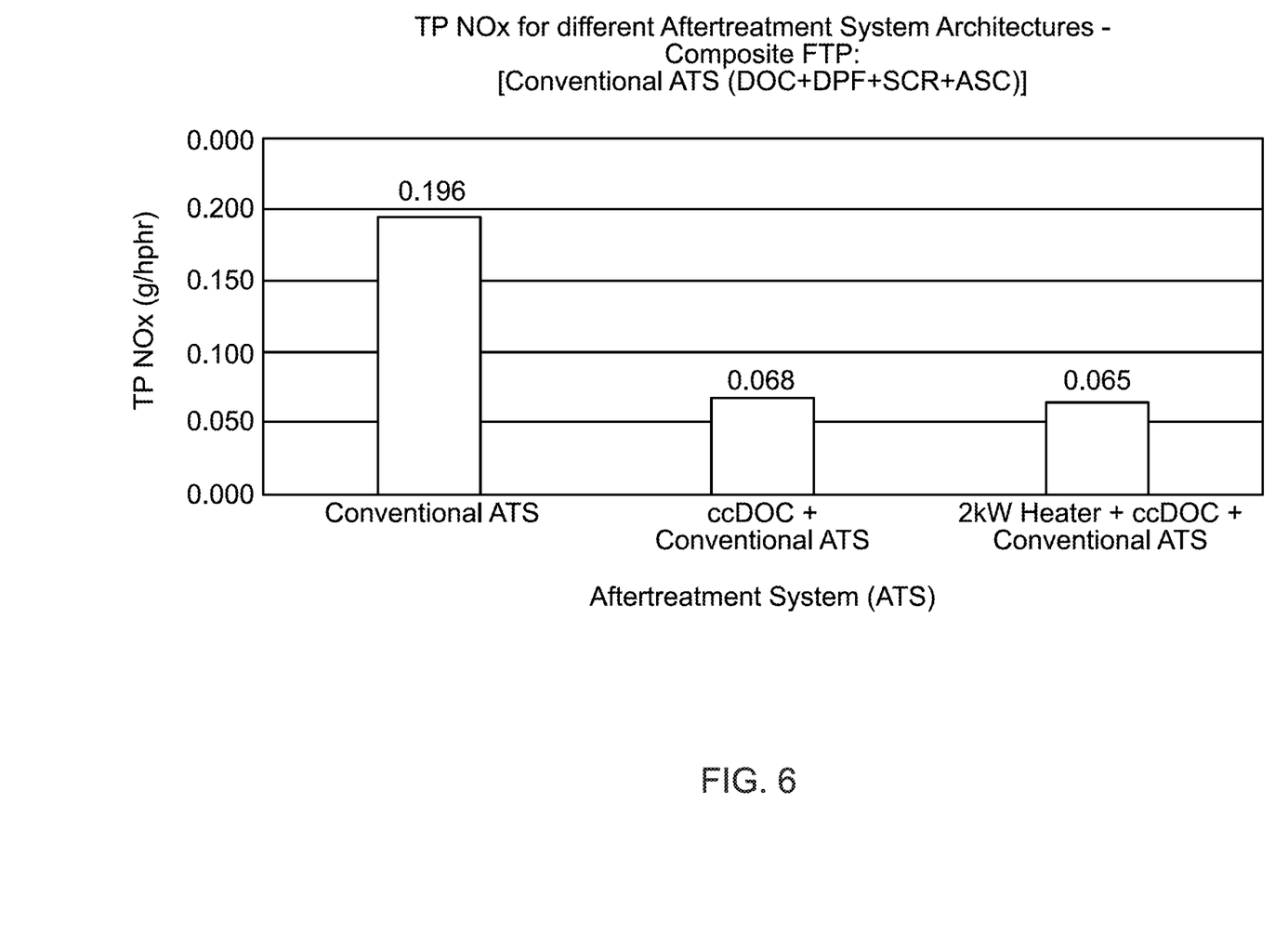
FIG. 6 is a bar chart showing amount of $NO_x$ emitted from a tail pipe of an aftertreatment system (ATS) that does not include the preheating oxidation catalyst (Conventional ATS), an aftertreatment system that includes a preheating oxidation catalyst (ccDOC+Conventional ATS), and an aftertreatment system that includes the preheating oxidation catalyst and a heater operatively coupled to the oxidation catalyst (2 kW heater+ccDOC+conventional ATS).

FIG. 6 is a bar chart showing amount of $NO_x$ emitted from a tail pipe of an aftertreatment system that does not include the preheating oxidation catalyst (Conventional ATS), an aftertreatment system that includes a preheating oxidation catalyst (ccDOC+Conventional ATS), and an aftertreatment system that includes the preheating oxidation catalyst and a heater operatively coupled to the preheating oxidation catalyst (2 kW heater+ccDOC+conventional ATS).

As can be seen in FIG. 6, the ccDOC+conventional ATS architecture with the optimized hydrocarbon dosing method results in more than 60% reduction in tail pipe $NO_x$ compared to the conventional ATS. Further, the incorporation of the heater can be seen to further improve the system performance and lower the system out $NO_x$. The heat generated from the preheating oxidation catalyst (ccDOC) not only helps $NO_x$ reduction over the SCR system but can also assist in oxidation of soot in filter thus making the system more passive and reduce the need of high temperature active regeneration. Therefore, the aftertreatment system architecture with ccDOC can enable ultra-low $NO_x$ at system out with minimal fuel penalty as well are assisted passive soot burn.

Figure 7:
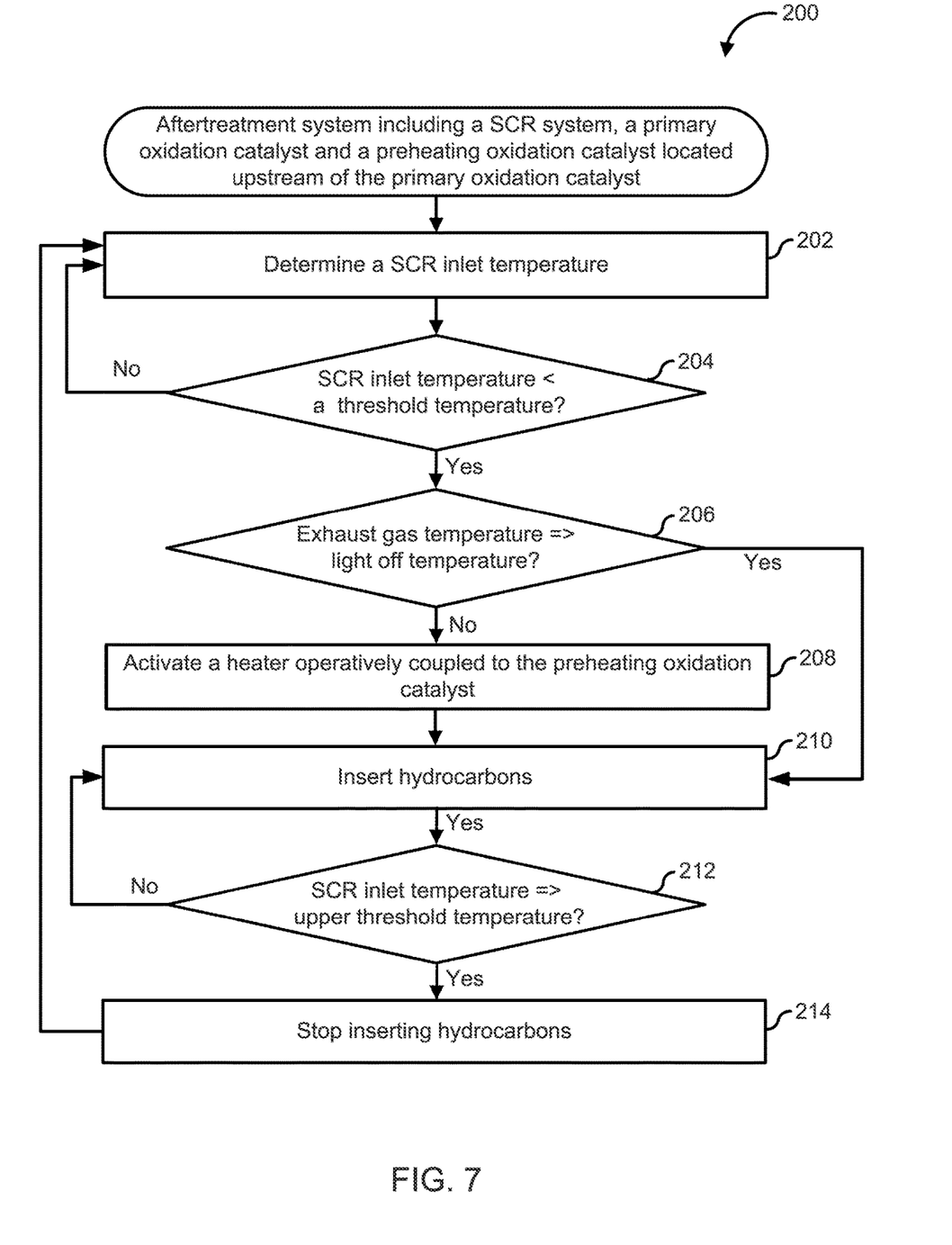
FIG. 7 is a schematic flow diagram of a method for managing temperature in an aftertreatment system, according to an embodiment.

FIG. 7 is a schematic flow diagram of an example method 200 for managing temperature in the aftertreatment system 100 that includes the SCR system 150, the primary oxidation catalyst 120, the preheating oxidation catalyst 180 disposed upstream of the primary oxidation catalyst 120, and may also include the heater 182 operatively coupled to the preheating oxidation catalyst 180. While described with respect to the aftertreatment system 100, the method 200 can be used with any other aftertreatment system that includes a preheating oxidation catalyst.

The method 200 includes determining a temperature of the exhaust gas entering the aftertreatment system, at 202. For example, the controller 170 may determine the SCR inlet temperature based on a temperature signal from the SCR temperature sensor 107. At 204, the controller 170 determines if the SCR inlet temperature is less than the threshold temperature. In response to determining that the exhaust gas temperature is greater than the threshold temperature (204:NO), the method 200 returns to operation 202.

If however, if it is determined that the SCR inlet temperature is less than the threshold temperature (204:YES), in some embodiments, the method 200 includes determining, by the controller 170, whether the exhaust gas temperature is equal to or greater than a light off temperature of the preheating oxidation catalyst 180, at 206. In response to the controller 170 determining that the temperature of the exhaust gas is greater than the light off temperature (206: YES), the method 200 proceeds to operation 210, and the controller 170 causes hydrocarbons to be inserted into the preheating oxidation catalyst 180 or into the exhaust gas upstream of the preheating oxidation catalyst 180 (e.g., via the engine 10 or by the first HC injector 116a via the hydrocarbon insertion assembly 114). If however, the controller 170 determines that the temperature of the exhaust gas is less than the light off temperature (206:NO), the controller 170 instructs the heater 182 to heat the preheating oxidation catalyst 180, at 208, for example, until the temperature of the exhaust gas is equal to or greater than the light off temperature of the preheating oxidation catalyst 180. The method 200 then proceeds to operation 210, as previously described herein. The controller 170 may then instruct the reductant insertion assembly 112 to insert a reductant into the exhaust gas flowing through the aftertreatment system 100.

At 212, the controller 170 determines whether the SCR inlet temperature (e.g., based on a temperature signal from the SCR temperature sensor 107) is equal to or greater than an upper threshold temperature (e.g., equal to or greater than about 250 degrees Celsius). In response to the SCR inlet temperature being less than the upper threshold temperature (212:NO), the method 200 returns to operation 210, and the controller 170 continues insertion of hydrocarbons into the preheating oxidation catalyst 180 or into the exhaust gas upstream of the preheating oxidation catalyst 180. However, if the controller 170 determines that the SCR inlet temperature is equal to or greater than the upper threshold temperature (212:YES), the controller 170 stops the insertion of the hydrocarbons, at 214, and the method 200 returns to operation 202.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "about" generally mean plus or minus 10% of the stated value. For example, about 0.5 would include 0.45 and 0.55, about 10 would include 9 to 11, about 1000 would include 900 to 1100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system for treating exhaust gas produced by an engine, the aftertreatment system comprising:
    an exhaust conduit configured to receive the exhaust gas;
    a preheating oxidation catalyst disposed upstream of the exhaust conduit;
    a primary oxidation catalyst disposed downstream of the exhaust conduit;
    a selective catalytic reduction system disposed downstream of the primary oxidation catalyst;
    a first hydrocarbon injector disposed upstream of the preheating oxidation catalyst; and
    a controller configured to:
        determine a temperature of the exhaust gas at an inlet of the selective catalytic reduction system, and
        in response to the temperature of the exhaust gas at the inlet of the selective catalytic reduction system being below a threshold temperature, cause the first hydrocarbon injector to insert hydrocarbons,
    wherein the preheating oxidation catalyst is configured to catalyze combustion of the hydrocarbons so as to increase the temperature of the exhaust gas to above the threshold temperature.

2. The aftertreatment system of claim 1, wherein the controller is configured to cause the first hydrocarbon injector to insert the hydrocarbons in response to the temperature of the exhaust gas being greater than a light off temperature of the preheating oxidation catalyst.

3. The aftertreatment system of claim 2, further comprising a heater operatively coupled to the preheating oxidation catalyst,
    wherein the controller is configured to selectively activate the heater in response to the temperature of the exhaust gas being less than the light off temperature of the preheating oxidation catalyst.

4. The aftertreatment system of claim 1, further comprising a second hydrocarbon injector disposed between the preheating oxidation catalyst and the primary oxidation catalyst;
    wherein the controller is further configured to:
        in response to the temperature of the exhaust gas reaching a light off temperature of the primary oxidation catalyst but still being below the threshold temperature, cause the second hydrocarbon injector to insert second hydrocarbons into the exhaust gas between the preheating oxidation catalyst and the primary oxidation catalyst.

5. The aftertreatment system of claim 1, wherein the controller is further configured to:
    in response to the temperature of the selective catalytic reduction system increasing to be equal to or greater than an upper threshold temperature that is greater than the threshold temperature, cause the first hydrocarbon injector to stop insertion of the hydrocarbons.

6. The aftertreatment system of claim 1, wherein the selective catalytic reduction system comprises an upstream catalyst and a downstream catalyst disposed downstream of the upstream catalyst.

7. The aftertreatment system of claim 6, wherein the upstream catalyst comprises a FeZ catalyst.

8. The aftertreatment system of claim 6, wherein the downstream catalyst comprises a CuZ catalyst.

9. The aftertreatment system of claim 1, wherein the preheating oxidation catalyst has a light off temperature that is lower than a light off temperature of the primary oxidation catalyst.

10. The aftertreatment system of claim 1, further comprising:
    a second hydrocarbon injector disposed between the preheating oxidation catalyst and the primary oxidation catalyst.

11. A method for controlling operations of an aftertreatment system that comprises a first hydrocarbon injector, an exhaust conduit, a preheating oxidation catalyst disposed downstream of the first hydrocarbon injector and upstream of the exhaust conduit, a primary oxidation catalyst disposed downstream of the exhaust conduit, and a selective catalytic reduction system disposed downstream of the primary oxidation catalyst, the method comprising:
    determining, by a controller, a temperature of the exhaust gas at an inlet of the selective catalytic reduction system; and
    in response to the temperature of the exhaust gas at the inlet of the selective catalytic reduction system being below a threshold temperature, causing, by the controller, the first hydrocarbon injector to insert hydrocarbons, the preheating oxidation catalyst being configured to catalyze combustion of the hydrocarbons so as to increase the temperature of the exhaust gas to be above the threshold temperature.

12. The method of claim 11, wherein the controller causes the first hydrocarbon injector to insert the hydrocarbons in response to a temperature of the exhaust gas being greater than a light off temperature of the preheating oxidation catalyst.

13. The method of claim 12, wherein the aftertreatment system further comprises a heater operatively coupled to the preheating oxidation catalyst, and wherein the method further comprises:
    causing activation of the heater, by the controller, in response to the temperature of the exhaust gas being less than the light off temperature of the preheating oxidation catalyst.

14. The method of claim 11, further comprising:
    in response to the temperature of the exhaust gas reaching a light off temperature of the primary oxidation catalyst but still being below the threshold temperature, causing, by the controller, a second hydrocarbon injector disposed between the preheating oxidation catalyst and the primary oxidation catalyst to insert second hydrocarbons.

15. The method of claim 11, further comprising:
    in response to the temperature of the selective catalytic reduction system increasing to be equal to or greater than an upper threshold temperature that is greater than the threshold temperature, causing, by the controller, the first hydrocarbon injector to stop insertion of the hydrocarbons.

16. A controller for controlling operations of an aftertreatment system that comprises a first hydrocarbon injector, an exhaust conduit, a preheating oxidation catalyst disposed downstream of the first hydrocarbon injector and upstream of the exhaust conduit, a primary oxidation catalyst disposed downstream of the exhaust conduit, and a selective catalytic reduction system disposed downstream of the primary oxidation catalyst, the controller configured to:
 determine a temperature of the exhaust gas at an inlet of the selective catalytic reduction system; and
 in response to the temperature of the exhaust gas at the inlet of the selective catalytic reduction system being below a threshold temperature, cause the first hydrocarbon injector to insert hydrocarbons, the preheating oxidation catalyst being configured to catalyze combustion of the hydrocarbons so as to increase the temperature of the exhaust gas to above the threshold temperature.

17. The controller of claim 16, wherein the controller causes the first hydrocarbon injector to insert the hydrocarbons in response to a temperature of the exhaust gas being greater than a light off temperature of the preheating oxidation catalyst.

18. The controller of claim 17, wherein the aftertreatment system further comprises a heater operatively coupled to the preheating oxidation catalyst, and wherein the controller is further configured to:
 selectively activate the heater in response to the temperature of the exhaust gas being less than the light off temperature of the preheating oxidation catalyst.

19. The controller of claim 17, further configured to:
 in response to the temperature of the exhaust gas reaching a light off temperature of the primary oxidation catalyst but still being below the threshold temperature, cause a second hydrocarbon injector disposed between the preheating oxidation catalyst and the primary oxidation catalyst to insert second hydrocarbons.

* * * * *